United States Patent
Van Den Bosch (10) Patent No.: US 12,527,427 B2
(45) Date of Patent: Jan. 20, 2026

(54) SYSTEM HAVING AN OBJECT SUPPORTED BY A VIBRATION DAMPING MOUNTING

(71) Applicant: VERSUNI HOLDING B.V., Eindhoven (NL)

(72) Inventor: Michael Van Den Bosch, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 18/721,165

(22) PCT Filed: Nov. 16, 2022

(86) PCT No.: PCT/EP2022/082150
§ 371 (c)(1),
(2) Date: Jun. 17, 2024

(87) PCT Pub. No.: WO2023/110272
PCT Pub. Date: Jun. 22, 2023

(65) Prior Publication Data
US 2025/0107654 A1    Apr. 3, 2025

(30) Foreign Application Priority Data
Dec. 15, 2021 (EP) .................................. 21214604

(51) Int. Cl.
*A47J 31/42* (2006.01)
*A47J 31/44* (2006.01)
(Continued)

(52) U.S. Cl.
CPC ........... *A47J 31/42* (2013.01); *A47J 31/4403* (2013.01); *F16F 15/067* (2013.01); *F16F 15/06* (2013.01)

(58) Field of Classification Search
CPC ........ A47J 31/42; A47J 31/44; A47J 31/4403; F16F 15/04; F16F 15/06; F16F 15/08; F16F 15/067; B23Q 11/0032
See application file for complete search history.

(56) References Cited

U.S. PATENT DOCUMENTS

| 4,253,634 A | 3/1981 | Daniels |
| 4,464,982 A | 8/1984 | Leuschner et al. |
| (Continued) | | |

FOREIGN PATENT DOCUMENTS

| CN | 103284606 A | 9/2013 |
| CN | 203609959 U | 5/2014 |
| (Continued) | | |

OTHER PUBLICATIONS

Extended European Search Report issued in connection with corresponding EP Application No. 21214604.7 dated Jun. 28, 2022.

*Primary Examiner* — Reginald Alexander
(74) *Attorney, Agent, or Firm* — Maschoff Brennan (57) ABSTRACT

An object is mounted within a housing of a coffee machine by a mounting which is to provide vibration damping for the object. The mounting includes a set of at least three springs, each having a top end coupled to the housing and a suspended bottom end at which the object is supported. The top ends define an upper polygon and the bottom ends define a lower polygon. A center of gravity of the object is along a vertical line which passes through the lower polygon, and springs are angled inwardly towards the lower polygon.

13 Claims, 5 Drawing Sheets

(51) Int. Cl.
*F16F 15/067* (2006.01)
*F16F 15/06* (2006.01)

(56) References Cited

U.S. PATENT DOCUMENTS

| | | | |
|---|---|---|---|
| 5,190,228 A | 3/1993 | Ficken et al. | |
| 5,308,224 A | 5/1994 | Olivero et al. | |
| 5,308,334 A | 5/1994 | Sancoff | |
| 6,227,102 B1 * | 5/2001 | Sham | A47J 31/42 99/287 |
| 2002/0053632 A1 * | 5/2002 | Becker | F16F 15/04 248/610 |
| 2012/0328456 A1 * | 12/2012 | Maisch | A47J 31/468 417/375 |
| 2014/0157956 A1 * | 6/2014 | Date | A47J 31/00 74/99 R |
| 2014/0270728 A1 | 9/2014 | Date et al. | |
| 2021/0364059 A1 | 11/2021 | Hayashi et al. | |

FOREIGN PATENT DOCUMENTS

| | | |
|---|---|---|
| CN | 103284606 B | 4/2016 |
| CN | 105916413 A | 8/2016 |
| CN | 209496439 U | 10/2019 |
| DE | 3137688 A1 | 4/1983 |
| DE | 3137666 C1 | 8/1983 |
| DE | 102020129399 A1 | 8/2021 |
| EP | 0 676 162 A1 | 10/1995 |
| EP | 0 676 162 B1 | 10/1999 |
| EP | 0 923 684 B1 | 6/2001 |
| EP | 1988206 A1 | 11/2008 |
| EP | 2858539 B1 | 1/2016 |
| FR | 1115329 A | 4/1956 |
| GB | 553793 A | 6/1943 |
| KR | 100244378 B1 | 3/2000 |
| RU | 2597537 C2 | 9/2016 |
| RU | 2597578 C2 | 9/2016 |
| SU | 852439 A1 | 8/1981 |

* cited by examiner

SYSTEM HAVING AN OBJECT SUPPORTED BY A VIBRATION DAMPING MOUNTING

CROSS-REFERENCE TO RELATED APPLICATIONS

The present application is a U.S. National Phase application under 35 U.S.C. § 371 of International Application No. PCT/EP2022/082150, filed on Nov. 16, 2022, which claims the benefit of European Patent Application No. 21214604.7, filed on Dec. 15, 2021. These applications are hereby incorporated by reference herein.

FIELD OF THE INVENTION

This invention relates to system having an object, such as a motor, which vibrates and is mounted by means of a mounting system for damping vibrations.

BACKGROUND OF THE INVENTION

Many household appliances use a motor, pump, grinder or other actuator to provide (part of) the main functionality of the appliance. To prevent excessive vibration at the device housing and/or excessive mechanical vibration noise, suspension systems are used to reduce mechanical vibrations from the actuator unit to the device housing. Suspension systems are also often used to reduce vibration related noise and/or to control the sound characteristics (e.g. change noise perception).

Examples of standard suspension systems include car suspension components (coil springs, leaf springs, torsion bar springs etc.), mounting systems for air conditioning units on buildings, refrigerator and freezer pump mountings, washing machine drum mountings, mounting systems for vibration- or shock-sensitive devices such as stereo systems, compact disc players, as for example disclosed in US2002/0053632, and mountings for motors in kitchen appliances. These use various combinations of springs and rubber mountings.

In most cases, placing a vibrating component on a rubber suspension component or using a simple coil spring suffices. However, for several applications this approach does not provide enough mechanical decoupling and/or sufficient stabilization or alignment of the component. Examples include the coffee grinder of a fully automatic coffee machine, the pump of a coffee machine, and the pump of a steam iron, in which a combination of springs and rubber motor suspension parts and mounts are used.

Some basic vibration damping mounting systems will first be outlined, before the system of the invention is explained.

Figure 1:
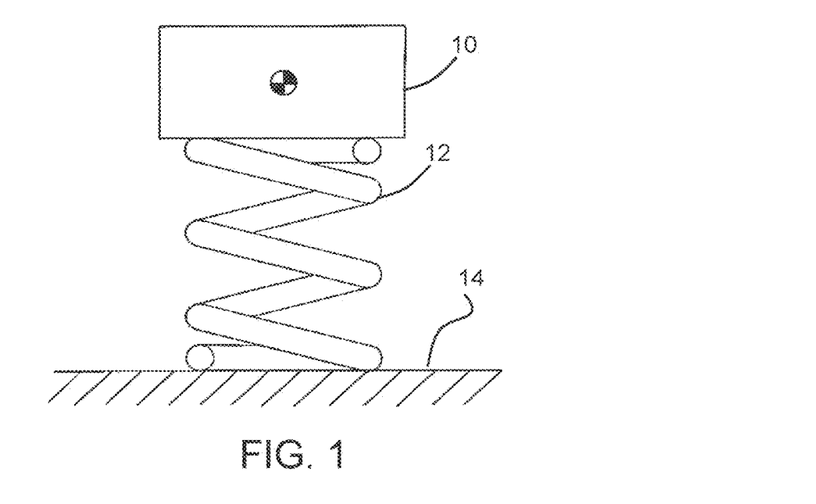
FIG. 1 shows an object mounted on top of a spring which is mounted to an underlying support.
Figure 2:
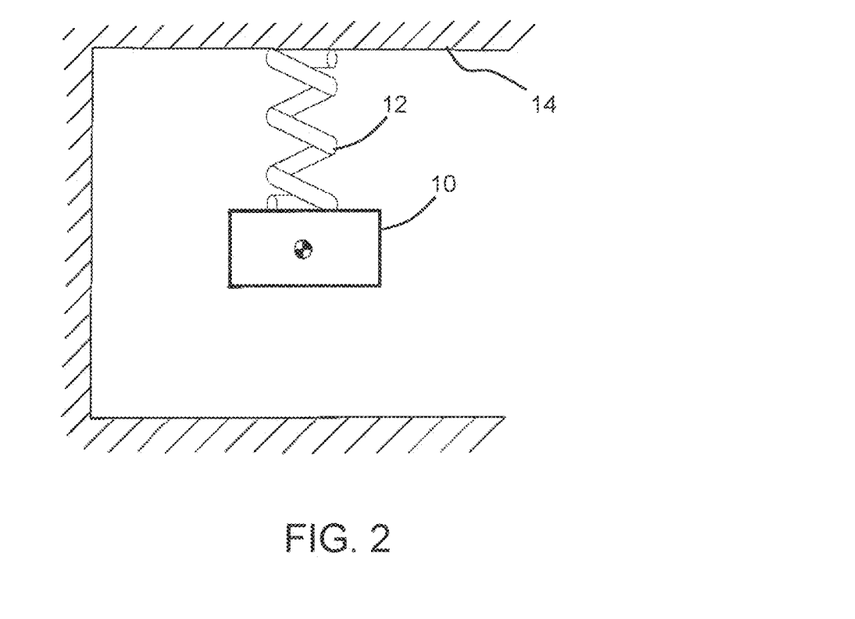
FIG. 2 shows an object suspended from a spring which hangs from a support above.

FIG. 1 shows an object 10 mounted on top of a spring 12 which is mounted to an underlying support 14, and FIG. 2 shows an object 10 suspended from a spring 12 which hangs from a support 14 above.

FIGS. 1 and 2 are representations in the 2D plane. To maintain the suspension function, the center of mass of the object is exactly in line with the mounting points of two ends of the spring. Otherwise, in FIG. 1 the object will topple over sideways and rotate around the top spring mounting point and in FIG. 2 the object will rotate around the bottom spring mounting until the center of mass is in line again with the spring mounting points. These rotary motions change the orientation of the object giving possible misalignment issues.

Figure 3:
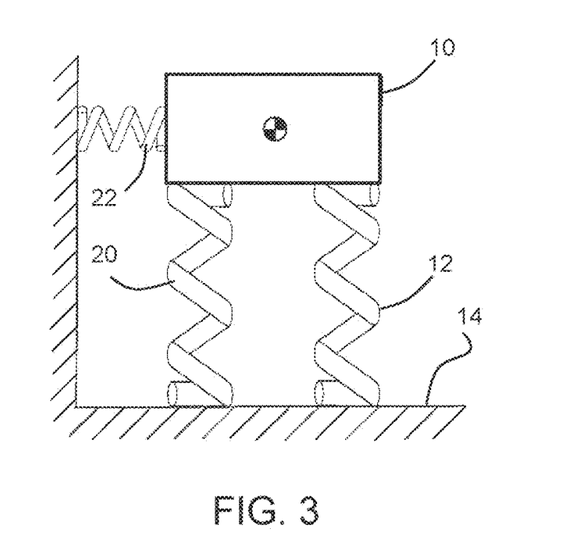
FIG. 3 shows a modification to the arrangement of FIG. 1 to prevent toppling.

For the example FIG. 1, toppling over can be prevented by the arrangement of FIG. 3 in which a second vertical spring 20 and a third horizontal spring 22 have been added. The second spring 20 restricts rotation of object and the third spring 22 restricts sideways movement of object.

Figure 4:
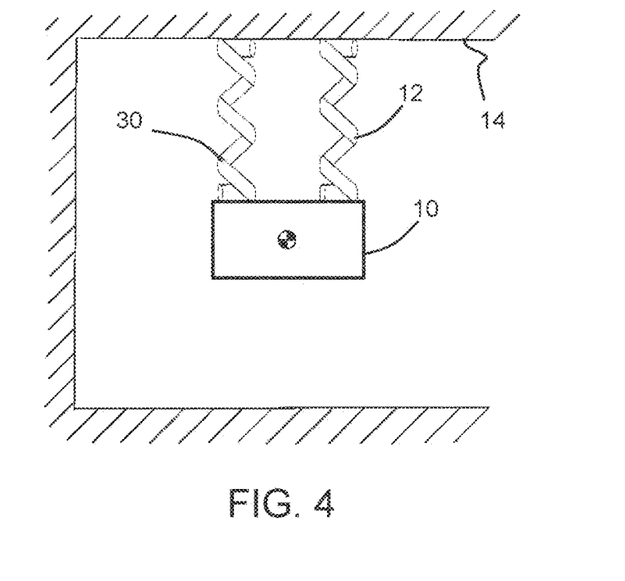
FIG. 4 shows a modification to the arrangement of FIG. 2 to rotation around the object-spring mounting point.

For the example of FIG. 2, rotation around the object-spring mounting point can be restricted by the arrangement of FIG. 4, in which a second vertical pendulum spring 30 is added. When the object tries to rotate around its center of mass, it is now restricted, because the two springs 12, 30 are placed at a horizontal distance from the center of mass of the object.

The free hanging arrangement of FIGS. 2 and 4 function as a pendulum system. If the object is pushed sideways and then let go, the object will automatically swing back to its neutral bottom position, giving a stable and self-aligning arrangement.

It is evident therefore that alignment is more complicated and requires more springs with an object placed on top of a spring arrangement compared to an object hanging from a spring arrangement. In general, the more springs, the higher the residual vibration forces towards the device housing. A suspension design, where an object is hanging, is therefore preferred since it requires a smaller amount of springs.

One of the main issues with suspension systems is to maintain suspension performance while also taking care of all the six degrees of freedom of movement (6-DoF) of the object that is suspended. 6-DoF includes the three translational movements and three rotational movements (around the center of mass) of the object. If any of the 6-DoF is neglected, the object is considered unstable, often causing positioning issues, instability and/or additional vibration transmission (often via unintended other contact points).

The two pendulum spring solution of FIG. 4 is suitable for a design in a 2D plane. An additional pendulum suspension point needs to be added in order to provide a suspension point in the third dimension.

Figure 5:
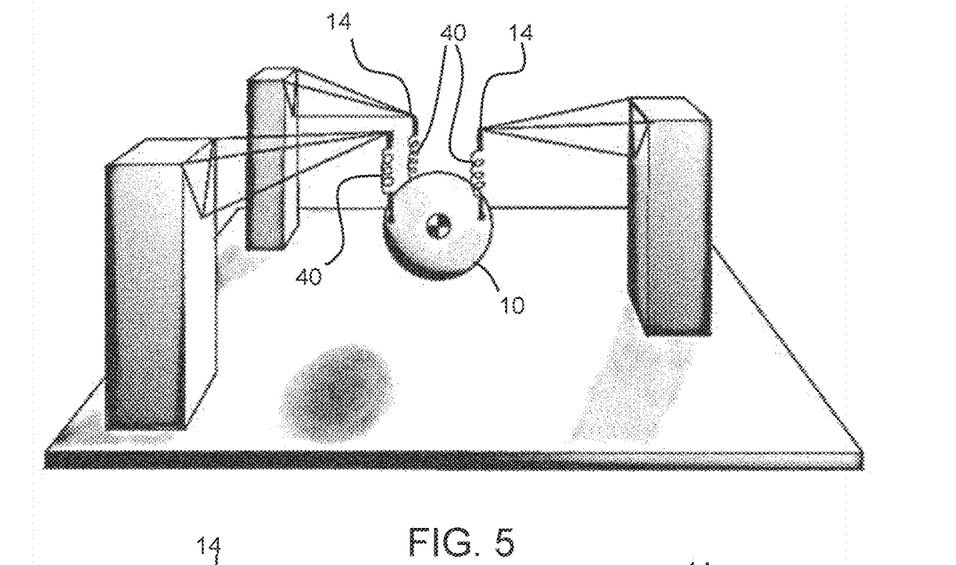
FIG. 5 shows a spring suspension system for an object using three vertical springs.

FIG. 5 shows a spring suspension system for an object 10 using three vertical springs 50 suspended below fixed rigid mounting points 14. The object can be assumed to be a point mass. The object is aligned well, but any excitation of the object will result in a large horizontal movement and/or rotation around vertical and horizontal axes.

There is therefore a need for an improved suspension mounting.

SUMMARY OF THE INVENTION

The invention is defined by the claims.

According to examples in accordance with an aspect of the invention, there is provided a system comprising:
 a housing; and
 an object mounted within the housing by a mounting which is to provide vibration damping for the object, wherein:
 the mounting comprises a set of at least three springs, each having a top end coupled to the housing and a suspended bottom end;
 the top ends define the apices of an upper polygon;
 the bottom ends define the apices of a lower polygon;
 the object is supported by the bottom ends of the set of springs; and
 in an intended operational orientation of the system, the center of gravity of the object is along a vertical line which passes through the lower polygon, and the line between the top end and bottom end of each spring is offset from the vertical, such that the lines taper inwardly between the upper polygon and the lower polygon.

This mounting design suspends an object, for which vibration damping is required, by a set of at least three springs (and preferably exactly three springs). The springs surround the object, and the bottom ends define a stable support plane. The object is supported by these bottom ends. In particular, the bottom ends of the set of springs define the only physical support for the object, i.e. it is fully suspended from above. The angle of vertical offset means the springs pull the object to the center, giving a form of pendulum effect. This gives the support stability and it aligns the object correctly in the horizontal plane. This avoids the need for additional supports, springs or damping systems and hence gives a reduced part count.

The object is thus hanging from a set of springs, such as a set of three angled springs, connected to a lower polygon which functions as a stabilization surface. The system makes use of the well-known pendulum effect to align the suspended object in the horizontal plane. The stabilization surface provides the stabilization of the object. This stabilization eliminates the need for additional supports thereby increasing the suspension performance with a reduced part count.

The angle of offset to the vertical is for example more than 5 degrees, for example more than 10 degrees. This applies during a normal operational orientation of the system. For example, for system intended to be mounted on a horizontal surface such as a kitchen worktop, the angles apply when the system is mounted on a horizontal surface, The angle of offset to the vertical is however preferably less than 45 degrees, for example less than 30 degrees.

The greater the angle, the greater the spring force that is needed to support the object vertically, but the greater the stabilizing forces.

The center of gravity of the object is preferably below a plane of the upper polygon. Thus, the object is suspended below the top polygon.

An upward vertical height from the plane of the lower polygon to the center of gravity is preferably less than a minimum distance between the center of gravity, when projected vertically onto the lower polygon, and the edges of the lower polygon. This gives the mounting stability against tipping over an edge of the lower polygon.

In one example, the center of gravity of the object is above the plane of the lower polygon. In this case, the upward vertical height is positive and should be less than the minimum distance as explained above.

In another example, the center of gravity of the object is below the plane of the lower polygon. In this case, the upward vertical height is less than zero, so this automatically meets the requirement to be less than the minimum distance as explained above.

The upper and lower polygons are preferably regular polygons.

The system may comprise exactly three springs. The upper and lower polygons are then triangles, preferably equilateral triangles.

The bottom end of each spring may comprise a support loop and the object comprises a set of feet which engage with the support loops. This makes the system easy to assemble. The object can simply be placed on the bottom ends of the springs (e.g. wire springs) using a notch or cone in feet of the object.

The top end of each spring may comprise a hook and the housing comprises receiving areas for receiving the hooks. This again makes easy assembly. The springs do not have to be bolted or clamped or rotationally hooked to the housing but can instead be slid linearly into place.

The system comprises a coffee machine. The object comprises an actuator which vibrates in use such as a motor or a component which incorporates a motor. A component which incorporates a motor is for example a coffee grinder, a fan or a pump.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system in which an object is mounted within a housing by a mounting which is to provide vibration damping for the object. The mounting comprises a set of at least three springs, each having a top end coupled to the housing and a suspended bottom end at which the object is supported. The top ends define an upper polygon and the bottom ends define a lower polygon. A center of gravity of the object is along a vertical line which passes through the lower polygon, and springs are angled inwardly towards the lower polygon.

As discussed above with reference to FIG. 5, three vertical suspension springs May be used to provide good alignment of an object, but any excitation of the object will result in a large horizontal movement and/or rotation around vertical and horizontal axes.

Figure 6:
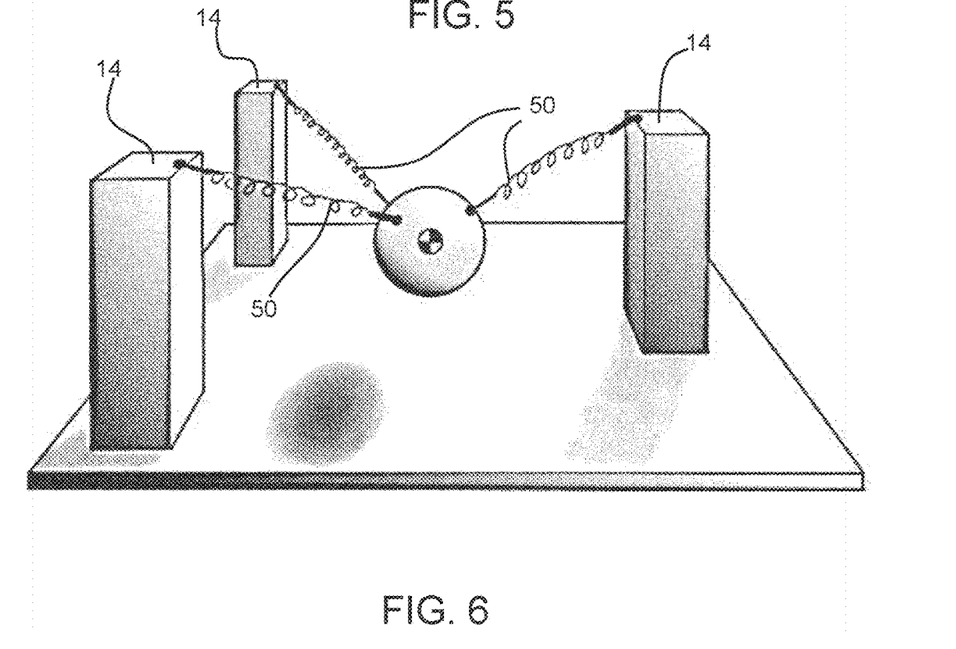
FIG. 6 shows a first approach for improving the stability of the arrangement of FIG. 5.

FIG. 6 shows a first approach for improving the stability. Instead of suspending the object from vertical springs, the springs are angled so that they apply an outward pulling force as well as supporting the vertical weight of the object. The combination of these outward forces resists movement of the object away from its intended position within a horizontal plane. Thus, this improves the positional stability.

However, the rotational stability of the object remains an issue.

The invention is based on locating the attachment points to the object further away from its center of mass, creating a stability surface, in combination with the angled spring approach of FIG. 6.

Figure 7:
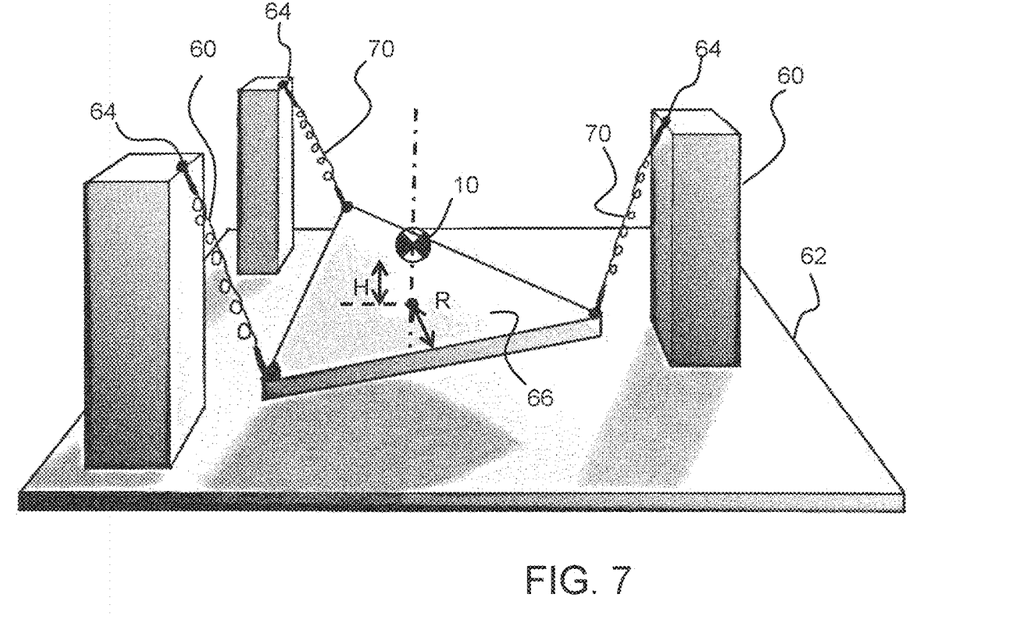
FIG. 7 shows an arrangement in accordance with the invention.

FIG. 7 shows an arrangement in accordance with the invention. It shows part of a system comprising a housing and an object 10 mounted within the housing.

The housing is schematically represented as three support pillars 60 and a base 62. The tops of the pillars are the top mounting points 64 for a set of three springs 70. Each spring 70 has a top end coupled to the housing at a mounting point 64 and a suspended bottom end.

The top ends, i.e. the three mounting points 64, define the apices of an upper polygon, in this example a triangle, preferably an equilateral triangle. The bottom ends of the springs also define the apices of a lower polygon, in this example also a triangle, and preferably an equilateral triangle.

The lower polygon defines a stability surface 66. However, this may be a virtual surface in the sense that there is no need for an actual planar support. Instead, the polygon and a virtual surface is defined by the three mounting points at the bottom ends of the springs 70. When the center of mass of the object is placed within this stability surface (or projects vertically onto this stability surface), the object will not rotate around the horizontal axes and is thus kept stable. The larger the (minimum) radius R from center of mass to the edges of the lower polygon (limiting the stability surface), the more stable the object becomes.

The radius R is the smallest perpendicular distance from the location of the center of gravity projected onto the plane of the stability surface and an edge of the lower polygon.

In general, a rotational moment M around the center of mass is divided by the arm length, i.e. radius R, resulting in a low force trying to rotate the object (if R is large) by trying to elongate the springs.

The angled springs used in FIG. 7 (and also shown in FIG. 6) thus stabilize the object with respect to rotation around the vertical axis as well as stabilizing the object position with respect to translation in the horizontal axes. In particular, the position stabilization is controlled by the spring stiffness rather than friction at the hinge points. The spacing R further stabilizes the object with respect to rotation around the horizontal axes.

The more angled the springs are oriented to the vertical, the larger the stability. However, this increased stability is at the cost of an additionally required tension in the spring to keep the object at the correct height, since only a portion of the spring tension is acting to support the weight of the object.

Figure 8:
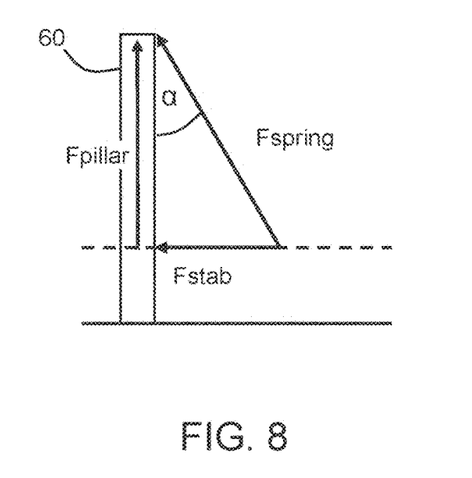
FIG. 8 shows the forces acting in the system.

FIG. 8 shows the force directions for the vertical pillar force Fpillar (the upward force the pillar needs to provide to carry the object). For each pillar, this is one third of the object weight. A stabilization force Fstab acts horizontally. Thus, the spring force Fspring needs to increase to maintain the same vertical force Fpillar if the angle α is increased in order to increase the stabilizing force Fstab.

The angled springs result in a taper inwardly between the upper polygon and the lower polygon, i.e. the upper polygon is a larger triangle than the lower polygon in this example. The angled springs pull the object to the center, giving a form of pendulum effect. This gives the support stability and it aligns the object correctly in the horizontal plane. This avoids the need for additional supports, springs or damping systems and hence gives a reduced part count.

The angle α of offset to the vertical of the springs is for example more than 5 degrees, for example more than 10 degrees. It is for example less than 45 degrees, for example less than 30 degrees.

The arrangement of FIG. 7 gives improved mechanical decoupling compared to a standard object mounted on a spring or a rubber mounting solution. The design reduces the number of parts needed by avoiding the need for additional features to prevent misalignment or toppling of the suspended object.

The basic approach is to suspend the object using a least number of spring elements as possible, and space the suspension points far apart from each other in order to create a large stability surface, e.g. triangle.

For the arrangement of FIG. 7, in the vertical direction, the center of mass of the object should be below the top mounting points 64 of the springs 70 so that the object is indeed suspended. In addition, the vertical distance H of the center of mass of the object to the plane of the lower polygon (in this case a stability triangle) should be less than R as defined above. This makes sure the object on the stability surface does not topple over on its stability plane along one of the edges of the lower polygon.

Note that the center of mass of the object may be below the plane of the lower polygon, in which case H is negative, so that H<R is satisfied no matter how far the center of mass lies below the plane of the lower polygon.

The invention has been tested for mounting a grinder motor of an integrated bean grinder of a coffee machine.

Figure 9:
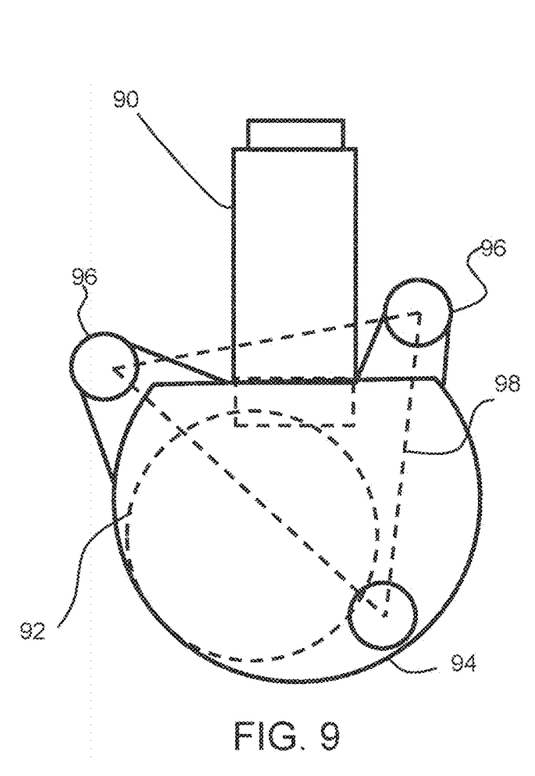
FIG. 9 shows a bean grinder viewed from beneath.

FIG. 9 shows the bean grinder viewed from beneath. It comprises a motor 90 which drives a grinding wheel 92 within a housing 94. The housing has three support feet 96 which define the lower polygon 98. The mounting for example aims to achieve approximately 10 dB of noise reduction.

Figure 10:
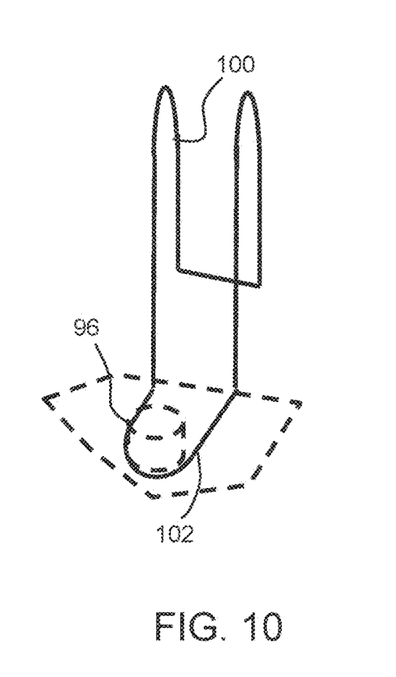
FIG. 10 shows one of the springs for supporting the bean grinder of FIG. 9.

One of the springs is shown in FIG. 10. It comprises a wire (in a closed shape) having a hook portion 100 at the top and a support loop 102 at the bottom. The support feet of the grinder each sit on a respective support loop. Each support foot for example comprises a projection, e.g. a conical projection, which fits through the support loop 102.

The spring is thus a wire loop rather than a coil spring. The spring force is primarily from the bend at the top of the hook portion. The hook portion 100 for example pushes (linearly) into a slot of the housing of the coffee machine and the bean grinder then simply rests on the support loops 102. The inward extension of the support loop defines the effective angle of the spring. Thus the angle is defined between the effective contact point between the support loop and the object foot and the effective contact point between the hook portion 100 and the housing.

The use of a wire spring is beneficial when there is limited space around the object to be suspended (especially when taking into account the required clearances for function and drop tests). A wire spring is also able to avoid resonance frequencies of the spring at the operating frequency range of the object (e.g. grinder) to ensure sufficient vibration isolation for noise reduction.

The system is also easy to assemble with a simple stacking operation. The springs do not need to be bolted, clamped or rotationally hooked at the housing. Instead, they can be slid into place. The spring design is such that the object is placed on low support loops with a simple interface such as a notch or cone to make sure the springs and object stay connected.

When there are three springs, they are arranged in a triangle, so the housing of the coffee machine has three slots for receiving the three springs, around the area where the bean grinder will be located.

The example above is based on the use of three springs, and this represents the minimum number of components. However, more than three springs may be used, for example with square upper and lower polygons for four springs, pentagonal upper and lower polygons for five springs, etc. Up to ten springs may conceivably be used, but it is preferred to use as few components as possible to achieve the desired damping performance.

The invention is of particular interest for household appliances, such as drinks machines, for example coffee machines. It may be used for suspending any motor, or component having a motor, such as a pump or grinder.

Indeed, the invention is applicable generally to any coffee machine with a fan, pump, or motor, which is mounted with a particular orientation.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A coffee machine comprising:
   a housing; and
   an object comprising an actuator which vibrates in use, mounted within the housing by a mounting which is to provide vibration damping for the object, wherein:
   the mounting comprises a set of at least three springs, each having a top end coupled to the housing and a suspended bottom end;
   the top ends define the apices of an upper polygon;
   the bottom ends define the apices of a lower polygon;
   the object is supported by the bottom ends of the set of springs so as to be fully suspended from above; and
   in an intended operational orientation of the system, a center of gravity of the object is along a vertical line which passes through the lower polygon, and the line between the top end and bottom end of each spring is offset from the vertical, such that the lines taper inwardly between the upper polygon and the lower polygon.

2. The coffee machine of claim 1, wherein an angle (a) of the offset to the vertical is more than 5 degrees.

3. The coffee machine of claim 2, wherein the angle (a) of the offset to the vertical is less than 45 degrees.

4. The coffee machine of claim 1, wherein the center of gravity of the object is below a plane of the upper polygon.

5. The coffee machine of claim 1, wherein an upward vertical height (H) from a plane of the lower polygon to the center of gravity is less than a minimum distance (R) between the center of gravity, when projected vertically onto the lower polygon, and the edges of the lower polygon.

6. The coffee machine of claim 1, wherein the center of gravity of the object is above a plane of the lower polygon.

7. The coffee machine of claim 1, wherein the center of gravity of the object is below a plane of the lower polygon.

8. The coffee machine of claim 1, wherein the upper and lower polygons are regular polygons.

9. The coffee machine of claim 1, comprising three springs.

10. The coffee machine of claim 1, wherein the bottom end of each spring comprises a support loop and the object comprises a set of feet which engage with the support loops.

11. The coffee machine of claim 1, wherein the top end of each spring comprises a hook and the housing comprises receiving areas for receiving the hooks.

12. The coffee machine of claim 1, wherein the object comprises a motor or a component which incorporates a motor.

13. The coffee machine of claim 1, wherein the object comprises a coffee grinder.

* * * * *